June 12, 1923.

E. G. KESLING

SHIFTING MEANS FOR TRANSMISSION GEARING FOR AUTOMOBILES

Filed April 16, 1918     7 Sheets-Sheet 5

1,458,421

WITNESSES
Howard D. Orr
F. T. Chapman

E. G. Kesling,
INVENTOR,

BY
E. G. Siggers
ATTORNEY

June 12, 1923.

E. G. KESLING

SHIFTING MEANS FOR TRANSMISSION GEARING FOR AUTOMOBILES

Filed April 16, 1918     7 Sheets-Sheet 7

1,458,421

Patented June 12, 1923.

1,458,421

UNITED STATES PATENT OFFICE.

ELMER G. KESLING, OF BLOOMFIELD, MISSOURI.

SHIFTING MEANS FOR TRANSMISSION GEARING FOR AUTOMOBILES.

Application filed April 16, 1918. Serial No. 228,892.

*To all whom it may concern:*

Be it known that I, ELMER G. KESLING, a citizen of the United States, residing at Bloomfield, in the county of Stoddard and State of Missouri, have invented a new and useful Shifting Means for Transmission Gearing for Automobiles, of which the following is a specification.

This invention has reference to shifting means for transmission gearing for automobiles, and its object is to eliminate the usual lever-control for shifting the transmission gearing and provide a selective control capable of having a manipulating part mounted on the steering post convenient to the steering wheel, or at some other point equally convenient to the operator of the vehicle.

In accordance with the invention the transmission gearing, which may be the same as or correspond to customary types of transmission gearing, is shifted into the different positions, such as low, intermediate and high speeds forward, reverse and neutral, solely by movements of the usual clutch lever, the particular setting predetermining the position into which the gears are to be moved, being under the control of means controllable by the operator of the vehicle, and having the manipulating portion of such small compass as to be readily mounted on the steering post or dash of the vehicle, such positions being convenient to the operator.

Connected to the customary clutch pedal lever of the vehicle is a movable structure carrying switch devices, actuating means for causing the shifting of the gears, which switch devices may be so set by the manipulating means and parts under the control thereof that when the clutch pedal is moved forwardly, the transmission gearing, irrespective of its previous position, is moved into the desired position which has been selectively predetermined.

The arrangement is such that when the clutch lever is moved forwardly to its full stroke, the gearing is always first moved to the neutral position and then out of the neutral position into the predetermined position for which the gear-actuating devices are set, the new setting being accomplished by the full forward movement of the clutch pedal under the action of the operator's foot.

Provision is made whereby the setting devices under the direct control of the operator are restricted to one at a time in their operation to prevent overlapping, a manipulated setting device invariably returning a previously manipulated one to the inactive position, whereby all liability of injury is avoided.

The invention will be best understood from a consideration of the following detailed description taken in connection with the accompanying drawings, forming part of this specification, with the understanding, however, that the invention is not confined to any strict conformity with the showing of the drawings but may be changed and modified so long as such changes and modifications mark no material departure from the salient features of the invention as expressed in the appended claims.

Figure 1:
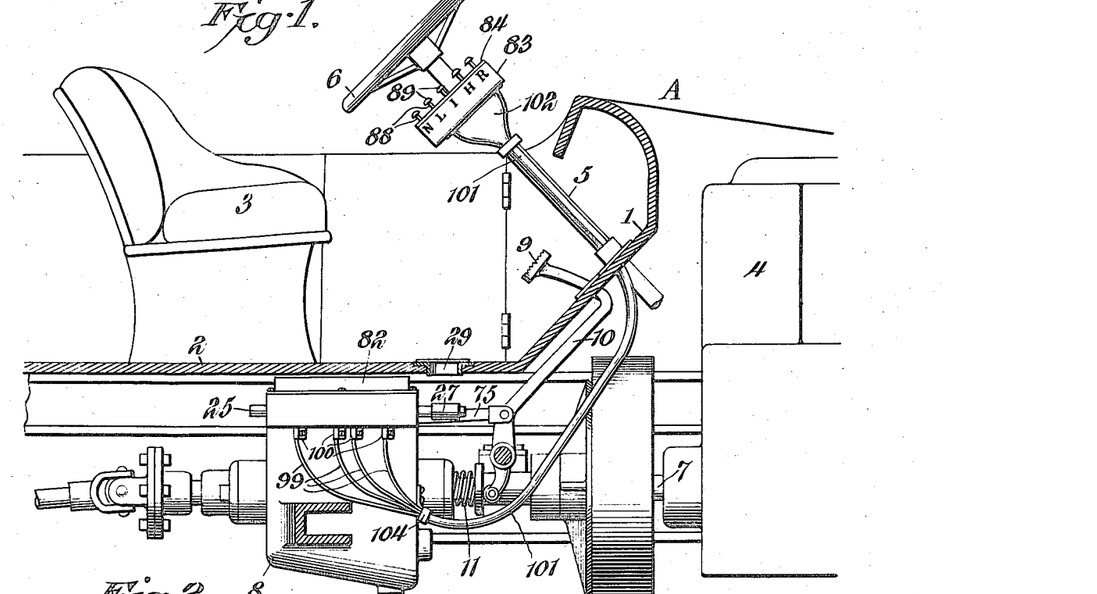
Figure 1 is a side elevation of a transmission gearing equipped with the invention and mounted on an automobile, some parts of the structure of the automobile being shown in section and other parts being omitted.
Figure 2:
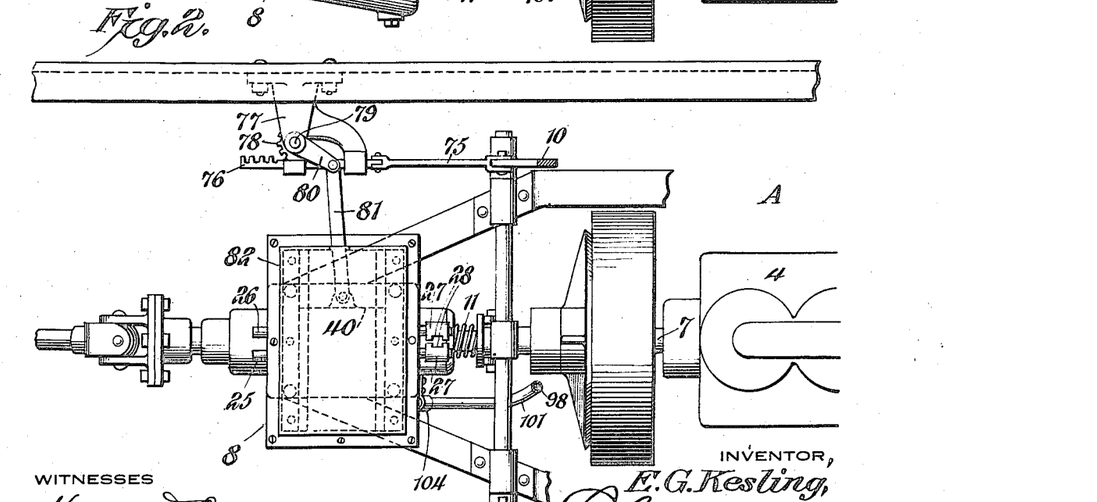
Figure 2 is a plan view of the structure shown in Figure 1 also omitting parts having no coactive relation to the invention.

Referring first to Figures 1 and 2, there is shown an automobile A provided with a dash 1, flooring 2, driver's seat 3, engine 4, steering post 5, steering wheel 6, engine shaft 7, transmission casing 8, and clutch pedal 9 with its clutch lever 10, and there is also shown a clutch spring 11. These named parts may be such as are usually found in automobiles and need no particular description, being referred to only for convenience of location of other parts to be described.

Figures 3, 4, 12:
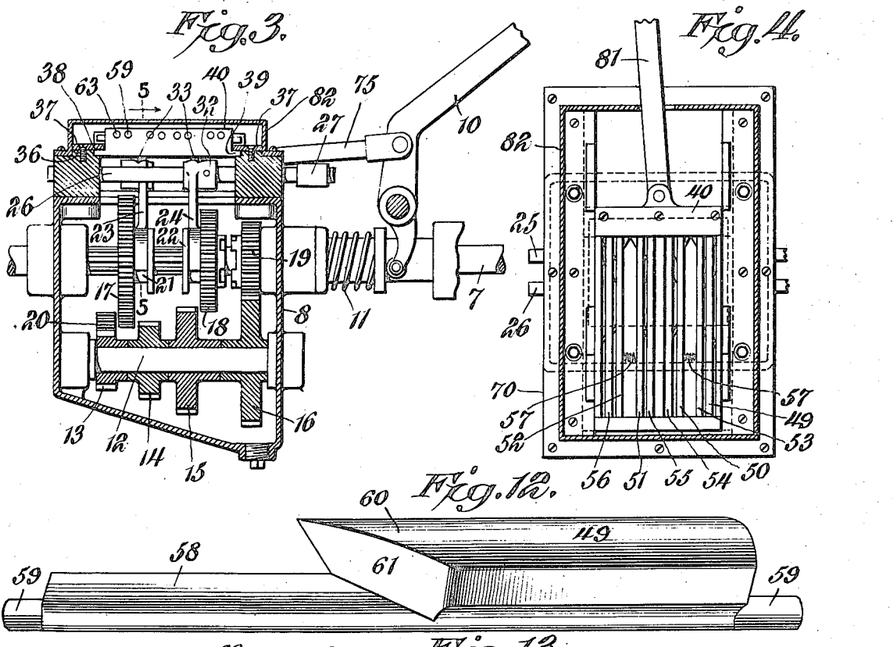
Figure 3 is a front to rear section of the transmission casing and elevation of the actuating mechanism for setting the transmission gearing, and drawn on somewhat larger scale than Figures 1 and 2.
Figure 4 is a top plan view of the structure shown in Figure 2, with the cover removed, the scale being the same as Figure 3.
Figure 12 is a perspective view of one of the switches shown in the structure of Figure 1 and associated figures, but drawn on a larger scale.
Figure 5:
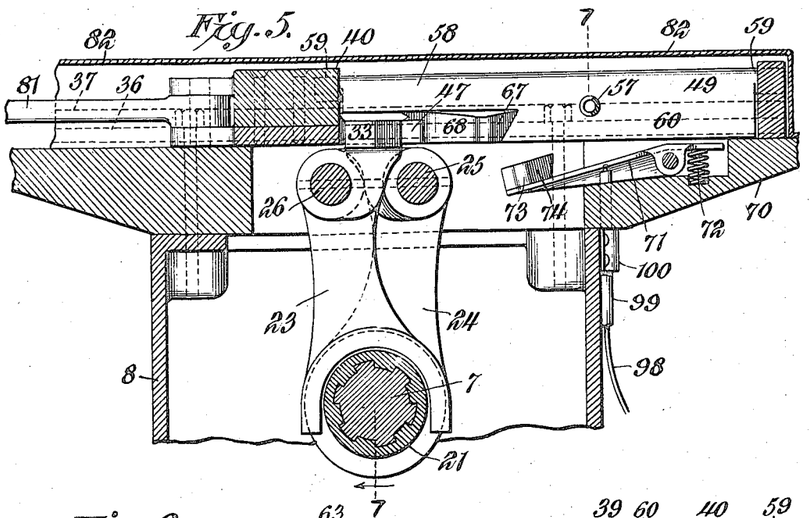
Figure 5 is a section on the line 5—5 of Figure 3, but drawn on a larger scale.

Referring further to Figures 3 and 5, the engine shaft 7 is shown as extending through the transmission casing 8, and in Figure 3 in which the transmission gearing is shown more in detail, there is also indicated a countershaft 12 on which are mounted gears 13, 14, 15 and 16 while on the engine shaft within the transmission casing there are other gears 17, 18 and 19. Independent of either shaft is an idler gear 20. The various gears referred to are such as are found in different types of transmission gearing of automobiles and require no special description, since the action is well understood. Furthermore, the invention is not to be taken as limited to the special transmission gearing shown, but is susceptible of adaptation of other types of transmission gearing, wherefore, the showing of Figure 3 with respect to the transmission gearing is to be taken merely as indicative of any suitable type of such gearing. Fast to the gears 17 and 18 are collars 21, 22 respectively, in which fit forks on the end of fork arms 23, 24 respectively, these arms being in turn made fast to slidable or reciprocable bars 25, 26. The structure so far described may follow the usual practice, it being the custom to reciprocate one or the other of the parts 25, 26 by means of a suitable lever to throw the gears into various associations for different speeds forward, one speed reverse and into a neutral position. In the structure of this invention the rods or bars 25 and 26 may be utilized for the shifting of the gears by a suitable hand lever, the bars each carrying a block 27 at one end with a recess 28 in one side matching the corresponding recess in the other block. The arrangement is intended as an emergency expedient so that in the event of the failure of the gear-shifting mechanism of the invention to work the gear shifting may be performed by a lever engaging either block 27 at the recess 28, the lever being insertable through an opening 29 in the floor 2.

In the structure shown in Figure 1 and associated figures, there is a supplemental casing 30 mounted on the casing 8 and provided with bearings 31 for the opposite end portions of the rods or bars 25 and 26, supporting these bars in their reciprocating or sliding movements by which these bars are made to shift the gears within the gear casing 8 into different operative positions. Although a cover member similar to the casing 30 with the bars 26 and fork arms 23 and 24 are present, it is preferable, for certain mechanical reasons, to substitute the casing or frame 30 and the bars 25 and 26 together with the fork arms 23 and 24 for those already present in installed transmission gearing rather than attempt to adapt the improvement to the like parts already present.

Each arm 23 and 24 is formed with a hub or collar 32 from which extends a member 33 on the side opposite to the arms 23 or 24, as the case may be, this member 33 being of conventional diamond configuration with pointed ends 34 and flattened sides 35, such shape being a preferable one, although by no means obligatory.

On opposite sides of the frame 30 are longitudinal ribs 36 carrying plates or strips 37 of greater width than the ribs, especially toward the inner edge of the frame, thereby providing guide grooves or channels 38 for angle tongues 39 projecting outwardly from opposite sides of a frame 40 capable of sliding in the grooves 38. The frame 40 may be elongated in the direction of sliding travel, such elongated rectangular form being shown in the drawings, but this does not preclude other shapes for the frame 40 which constitutes the body of a carriage on which are mounted certain devices to be described. The frame 40 is provided with a central longitudinal division web 41 in the particular showing of the drawings in Figures 3 to 7, although this web is not obligatory but still is useful as an abutment for certain parts. The web 41 divides the frame 40 into two elongated compartments 42, 43 respectively.

At one end of the compartment 42 and of less depth than the compartment are two spaced tongues 44, 45, each parallel one to the other on the facing sides and disposed on opposite sides of the longitudinal center line of the compartment. Similarly the compartment 43 is provided with two spaced tongues 46 and 47. Each tongue 44 to 47 projects into the corresponding compartment and terminates in a beveled end 48 tapering toward the center line of the compartment. The tongues define between each other and the sides of the compartment in which they are located a series of recesses or pockets designated by the letters L, N, R, I, N and H, corresponding to the various positions in the transmission and into which, as will hereinafter appear, the diamond projections 33 enter at sometime in the operation of the device.

In the compartment 42 there are located two rocker switch members 49 and 50 which may be identical except that they are rights and lefts. In the compartment 43 are two other rocker members 51 and 52 which are also identical except that they are rights and lefts, and as a pair and are the same as the members 49 and 50.

Associated with the rocker-switch member 49 to 52 are other rocker-switch members 53 to 56 respectively, these rocker switch members being in pairs corresponding to the first named switch members. By defining the rocker-switch members as rights and lefts does not necessarily mean that they are otherwise duplicates, for they may vary somewhat in shape and size in accordance with circumstances.

Each of the first named rocker-switch members is associated with a companion one of the second named rocker-switch members and these companion rocker-switch members are arranged with relation to each other longitudinally of the compartment in which they are located and each compartment, in the particular showing of the drawings, contains two pairs of companion rocker-switch members with one pair in opposition to the other pair and normally held apart by a spring 57 which also serves to confine the companion one of the second named switch members against the inner face of the side member of the frame 40 or of the web 41 by the action thereon of the other companion switch member under the force of the spring 57.

Since the working parts of all the companion switch members 49 to 52 are alike and the same is true with respect to the switch members 53 to 56, a description of one switch member, say the switch member 49 and of a switch member 53, will answer for all the other switch members.

The switch member 49 which is to be taken as an example of all the similar switch members, has an elongated rod-like axial portion 58 terminating at the ends in trunnions 59 journaled in the end members of the frame 40. For a portion of the length of the member 49, which portion may approximate half the length, there is an approximately segmental enlargement 60 which may extend from one trunnion end toward the other and terminates in a bevel portion 61 tapering toward the center line of the compartment.

Figure 13:
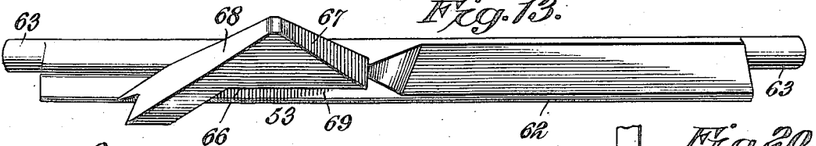
Figure 13 is a perspective view of the companion switch to that shown in Figure 12 and drawn on the same scale.

The switch member 53 which is the companion member to the switch member 49, comprises an elongated rod-like portion 62 having terminal trunnions 63 journaled in the end members of the frame. Where opposite the enlargement 60 of the member 49 the rod-like portion of the member 53 is beveled, as indicated at 64 in Figures 7 and 13, to conform to the engaging surface of the enlargement 60 when the two parts are in contact, this engaging surface being indicated at 65 in Figures 7 to 12. The member 53 at a point generally nearer to the neighboring tongue 44 than the enlargement 60 is provided with an enlargement 66 of generally triangular shape with the apex of the triangle presented toward the longitudinal center line of the compartment 42 in which it is located while one face 67 of the triangle is shorter and presented toward the bevel end 61 of the member 60. The other bevel face 68 of the triangle is presented toward the bevel 48 of the finger 44 and reaches close to but is separated from the inner wall of the neighboring side of the frame 40. The base portion of the triangle 66 is cut away to provide a receptacle 69 to receive a part to be hereinafter described, the shortened side 67 of the triangle providing an exit through which the part entering the recess may escape during certain initial movements.

The two members 49 and 53 have working faces all of which are beveled or sloped in such manner that when in various working positions they will always be presented flatwise to or parallel with the sides or flats 35 of the diamonds 33, this being for a purpose which will hereinafter appear.

Since the frame 40 slides lengthwise on the frame or casing 30 the latter is elongated sufficiently for the purpose and is shown in the drawings as overhanging the transmission gear casing 8. At one end, this overhang, indicated at 70, houses a series of levers 71, each underridden at one end by a spring 72 normally holding the other end lowered and at said other end each lever carries a wedge 73 which may be in the form of a block, adding weight to such end of the lever and aiding the spring 72 in holding the block in the lowered or depressed position. In the showing of the drawings, there is a wedge block 73 for each receptacle or pocket 69 and these wedge blocks have each a beveled face 74 so positioned as to engage the bevel face 61 of an appropriate one of the switch members 49 to 52. The wedge blocks 73 are operated into active position and away from their normal position by means to be hereinafter described.
Connected to the clutch pedal lever 10 is a link 75 extending and connected to a rack bar 76 mounted in a bracket 77 which may be fast to a part of the frame of the machine and this rack bar intermittently meshes with a pinion 78, which may be either a complete or mutilated pinion, mounted on a rock shaft 79 carrying a rock arm 80 connected by a link 81 to the frame 40, which latter in the installed apparatus is closed in and protected by a cap 82. The parts are so timed in operation that the clutch pedal may be moved from the full clutch-engaging position forwardly for about half stroke before having any effect upon the frame or carriage 40, at which half stroke the clutch is fully disengaged. At about this point the teeth of the rack bar 76 engage the pinion 78 and through the arm 80 and link 81 propel the frame or carriage 40 in the active direction. From about the half position to the full forward position of the clutch pedal the carriage is given its full stroke in one direction and on the return of the clutch pedal the carriage is returned with it for the return half stroke of the clutch pedal, being then released from the clutch pedal and remains quiescent when the clutch pedal returns the rest of the way to the full back position.

Figure 6:
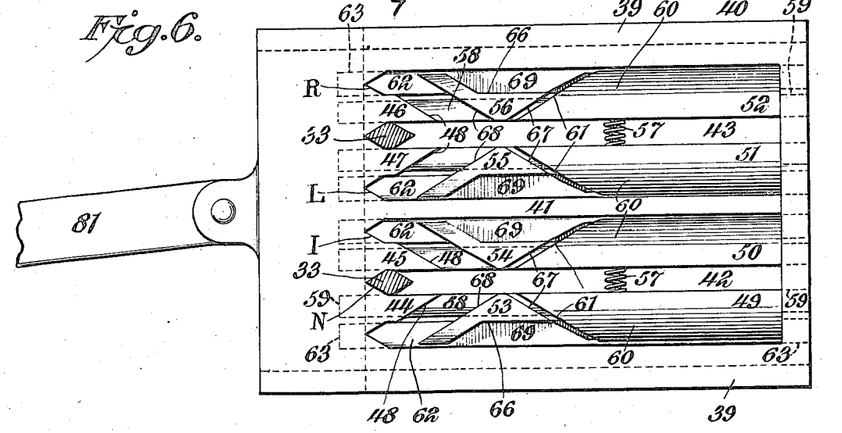
Figure 6 is an inverted plan view of the reciprocatory switch carriage, with certain other parts shown in section.
Figure 7:
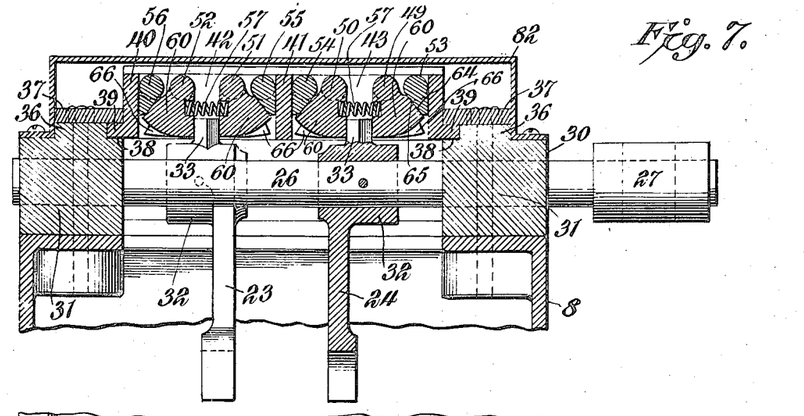
Figure 7 is a section on the line 7—7 of Figure 5, and omitting some parts.
Figure 8:
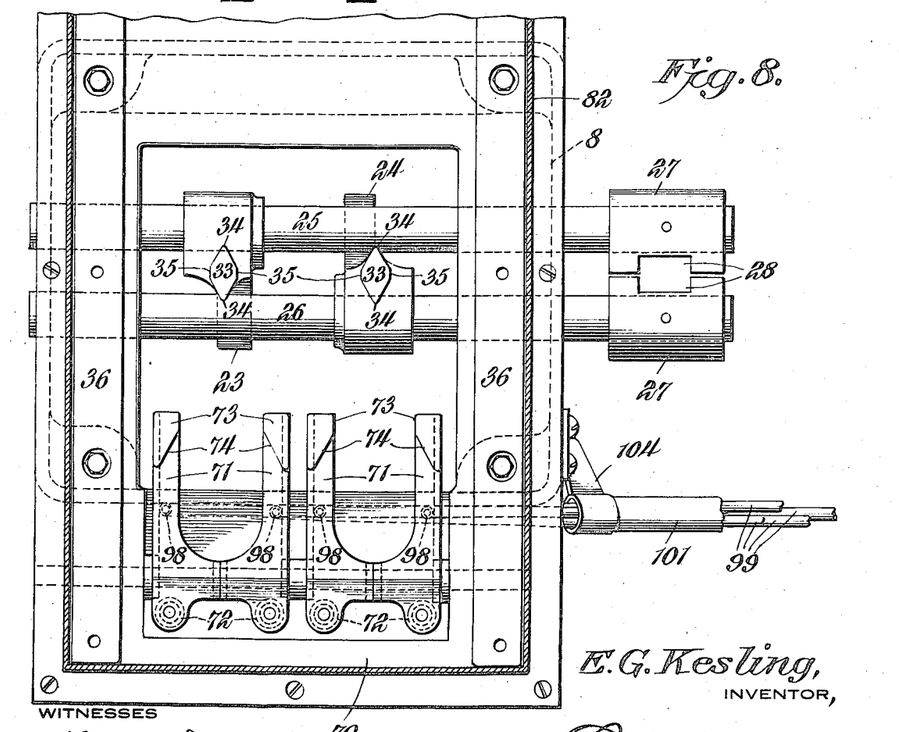
Figure 8 is a plan view of the transmission casing and attachment therefor, omitting the switch carriage and distant parts, and showing a portion of the dust cover in section.

Let it be assumed that the automobile is standing still with the gears in neutral in which case the diamonds 33 are in the neutral pockets marked N in Figure 6, and it is desired to start the vehicle, it being further assumed that the engine is running. The wedge block 73 which, when raised, will engage in the recess 69, is actuated by mechanism to be described so as to lodge in the recess 69. Now, the clutch pedal is pushed forward until it has traversed about half the distance of its full stroke, whereupon, the carriage 40 is started toward the left as shown in Figure 6, it being remembered that the showing of Figure 6 is upside down. When the carriage is being moved by the forward movement of the clutch pedal the wedge block is engaged by the switch memmer 51 and this switch member 51 is forced by the wedge block engaging the bevel surface 61 away from the neighboring side of the web 41. At the same time, the carriage has moved away from the diamond 33 in the neutral pocket in the chamber 43 until it has passed beyond the points of the fingers 46 and 47 and the bevel surface 61 is then in position to engage the diamond 33 and switch it into a path defined between the surfaces 61 and 67 to divert it toward the web 41 adjacent to the switch member 51. Since the diamond 33, under consideration, is fast to or an integral part of the yoke 23, the gear wheel 17 is moved into mesh with the gear wheel 14 on the counter or gear shaft 12. While this is transpiring the switch member 52 in the compartment 43 is held against the associated switch member 56 by the spring 57 and the switch member 52 being then in engagement with the switch member 56 holds the latter against the same side bar of the frame 40. The switch member 51, however, has been rocked toward and against the switch member 52 so that the diamond 33, under consideration, is diverted toward the web 41 in the manner already described. The switch member 51, however, is not rocked against the action of the spring 57 until the diamond 33, under consideration, has come sufficiently into the path of the triangle or projection 66 of the switch member 55 to prevent it from moving away from the web 41 so that the diamond 33 may be diverted laterally into the space then provided between the bevels 61 and 67, the actuated wedge 73 having in the meantime left the cavity or recess 69 and entered between the switch member 51 and the web 41, thus rocking the switch member in the manner already described toward and against the switch member 52. This is the position of the parts when the clutch pedal has reached the limit of its forward movement and the gears are set, the particular position of the gears being for low speed forward.

On releasing the foot pressure upon the clutch pedal the latter moves to the rear in the ordinary way moving the slide or carriage 40 to the right as viewed in Figure 6, the diamond, under consideration, entering the cavity or recess 69 and the edge 73, under consideration, following. This movement continues until the diamond reaches the longer end of the projection or triangle 66 and causes a rocking of the switch member 55 toward the longitudinal center line of the chamber 43 out of the path of the diamond 33, which latter ultimately enters the pocket L and seats therein while the spring 57 returns the switch members 51 and 55 to their initial position with the wedge 73 within the recess or cavity 69. This accomplished by the time the clutch pedal has reached about half of its rearward movement, at which point the teeth of the rack 76 pass from engagement with the teeth of the pinion 78 and the remainder of the movement of the clutch is without effect upon the carriage 40, being utilized solely for connecting the engine to the driving wheels of the vehicle with the gearing in low and the car will move forward at low speed. When it is desired to move the clutch into neutral for coasting or the like without change of gearing, this may be done without in any manner affecting the carriage or the parts controlled thereby, by simply depressing the clutch pedal to about one-half stroke.

When it is desired to change the gearing a suitable other one of the wedges 73 is moved into the proper cavity or recess 69 and the clutch pedal is pushed forwardly to its full extent and returned in the manner already described, whereupon, the diamond, first considered, is directed by the bevel 68 toward the longitudinal center line of the compartment 43 and if the desired gear setting be that for a higher speed the other diamond then in neutral will be directed by the switch member 49 or 50, as the case may be, to one side or the other of the compartment 42. Since under the conditions assumed, the switch members 51 and 52 are held apart by the spring 57 between them, the diamond previously in low will enter between the apexes of the triangular projections 66 of the switch members 55 and 56, when the clutch pedal is returned to the clutching position the diamond first under consideration, will have returned into the neutral pocket and the other diamond will have seated in a manner similar to that already described into the intermediate or high speed pocket, as the case may be, as already described for low speed. When it is desired to reverse the travel of the car the procedure is similar to that described for the change of forward speeds.

In the operation of the switch members the action of the members 49 to 52 upon the diamonds 33 is to cause the shifting of the transmission gears from a neutral position into the active or meshing position, wherefore, these switch members may be termed gear-shifting switches. The action of the switch members 53 to 56 upon the diamonds is to shift the gears from intermeshed or driving positions to neutral positions wherefore, the switch members 53 to 56 may be termed neutralizing switch members.

In the operation of the structure the wedges are selectively controlled and serve as the selecting elements, which in turn cause the operation of the gear-shifting switches and the latter automatically control the action of the neutralizing switches, said neutralizing switches yielding to the diamonds when passing them in a selected position and then snapping back, so that when the carriage or cage in which the switches are mounted is again moved by the clutch lever the diamonds are always automatically moved to the neutral position. Suppose in the forward movement of the carriage or cage it has been moved to half stroke position, which is the same as three-quarter stroke position of the clutch pedal, in which event the previously set diamond has been moved to neutral position by the appropriate wall 68, and in which position the diamond is in the longitudinal center line in the compartment in which it is located and in line with the neutral pocket. If, now, the carriage or cage be allowed to return to its first position the diamond will pass into the neutral pocket whether its previous position was a selected position or a neutral position and regardless of whether any selective wedge was in place. Suppose, with no change in the previous selection of the wedges, a full stroke be imparted to the carriage or cage and it be allowed to return to its initial position, the diamonds will return to their previous positions. If, upon a new selection having been made with respect to the wedges and the full stroke of the carriage or cage be accomplished the selected diamond is shifted to cause the desired coupling of the gearing and on the return of the carriage to its first position the new relation of the gearing is maintained, as before described. Suppose, now, with no wedge selected that the forward stroke of the clutch pedal be sufficient to move the carriage or cage to or beyond the neutral shifting position but the forward stroke is incomplete, then upon a return stroke of the carriage the diamond shifted by the incomplete forward stroke will be directed into the neutral pocket. If, under the conditions just assumed with the addition that a selection has been made so that the diamond is shifted toward the selected position beyond neutral, but the stroke is incomplete, the same return to the neutral pocket occurs upon the return of the carriage, the diamond being returned into the neutral path by the action of the wall or surface 67. If the forward stroke of the carriage has been insufficient to shift the diamond to the neutral position whether or not a new selection has been made, the diamond is shifted back to the first position by the wall 48. It will be readily understood that if the shifting of the diamond be such as to carry its longitudinal center line beyond the point of a finger defining the neutral pocket or beyond the point of the wall 67 at the recess 69, even though the stroke of the carriage is not fully completed, then the shifting of the diamond is completed by the engagement of such points with the corresponding bevel wall of the diamond, this being the only shifting of the diamond possible by the return movement of the carriage.

Figure 9:
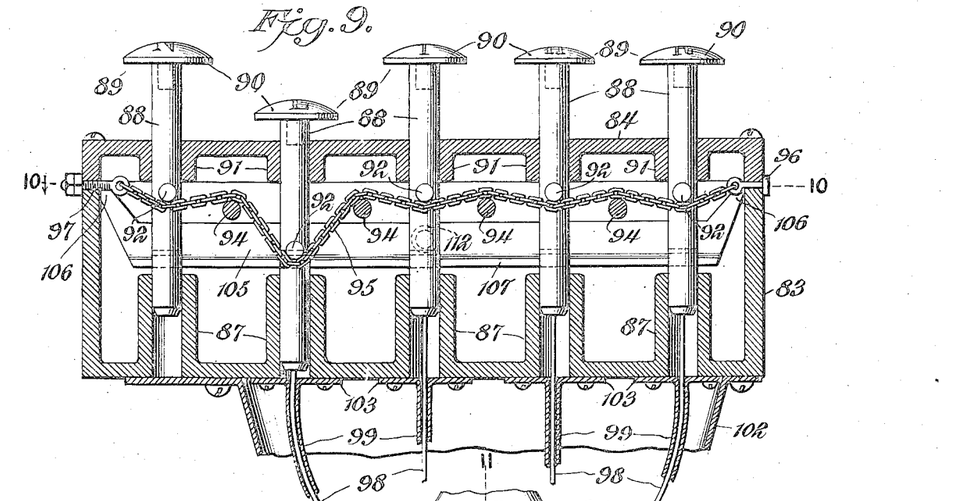
Figure 9 is a section through the control button structure shown in Figure 1 as mounted on the steering post.
Figures 10, 11:
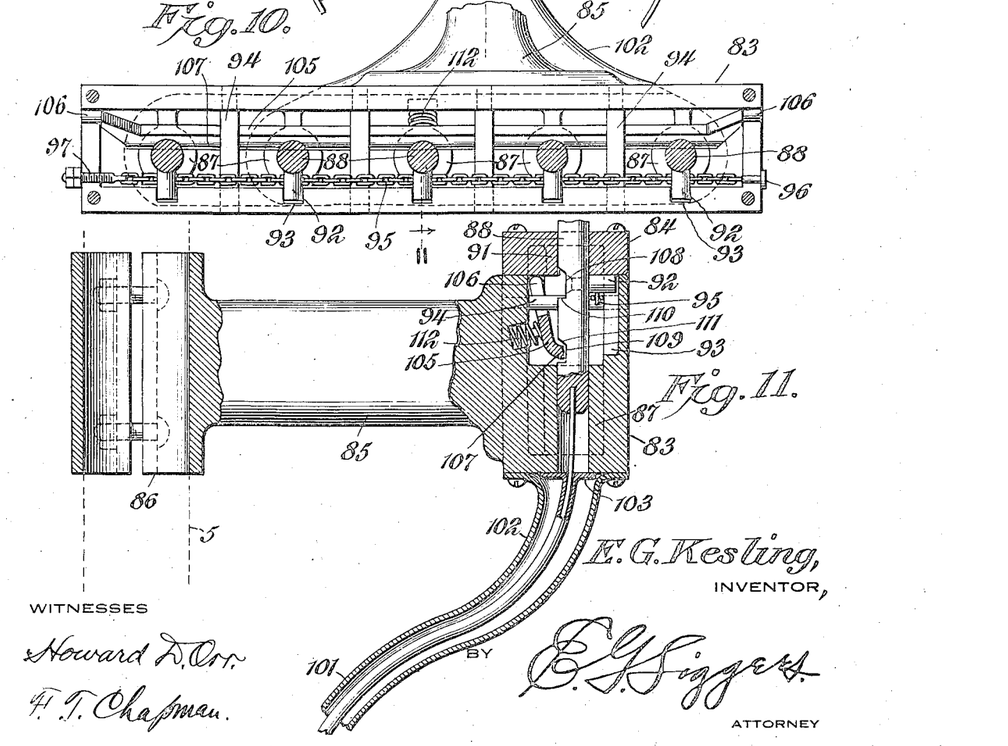
Figure 10 is a section on the line 10—10 of Figure 9.
Figure 11 is a section on the line 11—11 of Figure 10.

Referring now principally to Figures 1, 5, 8, 9, 10 and 11, there is shown a box or casing 83 which may be provided with a removable cap 84 and this box has a side arm 85 projecting therefrom and terminating in a clip structure 86 to clamp on the steering post 5 of the vehicle, although the arrangement may be such that the box 83 may be attached to the instrument board. The interior construction of the box 83 is best illustrated in Figures 9, 10 and 11 where the bottom of the box is shown as provided with a series of hollow bosses 87 forming guides for stems 88 of push-buttons 89 which may or may not be provided with removable heads 90. The stems 88 extend through reinforced passages 91 in the cover 84 alined with respective guides 87 in the bottom of the box. Each stem 88 has a pin 92 projecting from one side thereof and movable in a corresponding guide slot 93 in one side of the box. Within and traversing the box are pins 94 between the stems 88. Extending lengthwise of the box is a flexible member 95 which may be in the form of a chain although not limited to such particular structure, one end of the chain being fast to one end wall of the box 83 as by an eye pin 96 riveted or otherwise secured thereto while the other end of the chain is made fast to an eye bolt 97 in the opposite end of the box, such bolt being provided for purposes of adjustment, but any other means of adjustment may be used. The chain underrides each pin 92 and overrides each pin 94 and has sufficient slack so that any one of the push-buttons may be depressed, in which event all the other push-buttons are elevated, and in case a push-button has been depressed and another push-button is subsequently depressed the first named push-button is elevated by the depression of the second button, this being caused by the chain straightening where underriding the pin of the first depressed push-botton due to the depression of the chain at the second named push-button between two adjacent pins 94 fixed in the box, or a pin 94 and the secured end of the chain.

Each of the stems, except one, has fast thereto a flexible rod 98 extending from the stem to the overhang portion 70 of the casing or frame 30 where it has the lever 71 in its path at the end of the lever carrying the corresponding wedge 73. The rod or wire 98 between the box 83 and the casing 30 is surrounded by a tube 99 forming a guide tube quite closely embracing the wire, but still of sufficiently large internal diameter to permit the wire to move freely therethrough. The end of the tube 99 at the casing 30 may enter the latter and in order to secure the tube in place it may be made fast to the casing 8 by a clip 100. There are as many push-buttons as there are wedges 73 and an additional push-button which, however, is not supplied with a wire or rod 98, but serves simply as a means for returning any one of the other push-buttons which may have been previously depressed to set a wedge 73 into active position. In order to identify the wedge-operating push-buttons with the appropriate wedges they may be lettered or otherwise designated to guide the operator in choosing the proper push-button to actuate the desired wedge. In order to protect and group the tubes 99 with their contained rods 98 there is provided a larger tubular member 101 having a funnel-like end 102 fitted and secured to the portion of the box 83 from which the tubes 99 extend, the latter being individually fastened to the box by terminal plates 103 made fast in any appropriate manner to the box. The tube 101 is carried to the casing 8 to which it may be made fast by a bracket 104 or in any other suitable manner and from this point the tubes 99 may be spread out to conform with the positions of the levers 71.

Within the box 83 and extending lengthwise thereof is a latch bar 105 having trunnion ends 106 mounted in the ends of the box. One edge 107 of the bar 105 is so related to the axis of rocking of the bar as to be eccentric thereto, the said edge being bent somewhat to the plane of the bar, which latter may be otherwise substantially flat.

In each stem 88 there are two notches 108 and 109 spaced apart lengthwise of the stem and into either of which notches the contiguous portion of the edge or lip 107 may enter. The lower edge of the notch 108 is squared or approximately of such shape, as indicated at 110, while the upper edge of the notch 109 is curved or beveled in conformity with the lip 107, as indicated at 111. A spring 112 engaging the latch bar 105 imparts to it a normal constraint toward the stems 88.

In Figure 9 one of the stems 88 is shown depressed, thus tightening the chain with respect to the other stems and holding the latter in the elevated position. The depressed stem, which, in the particular showing belongs to the push-button marked L, is held in the depressed position by the latch bar 105 having its edge or lip 107 engaging in the upper notch 108 of the stem of the push-button marked L, while the same lip where opposite the other push-buttons seats in the notches 109 of the other push-button stems. When a raised push-button is depressed the shoulder 111 in the notch 109 ejects the lip 107 by reason of the engagement of the bevel shoulder 111 therewith, the latch bar being rocked against the action of the spring 112, thus releasing the lip 107 from holding engagement in the notch 108 of the depressed push-button. A continued downward movement of the push-button being operated at the time tightens the chain with respect to the other push buttons and lifts the previously depressed push-button to its elevated position, those not previously depressed at the time remaining in the elevated position with the chain there holding them. Whenever a push-button is lowered to its full extent and all the other push-buttons are raised the upper notch of the lowered push-button and the lower notches of all the other push-buttons are in alinement and in position to receive the lip 107 which moves thereinto under the action of the spring 112.

In the operation of the gear-shifting structure hereinbefore set forth, the initial condition assumed, that is, with the diamonds 33 in the neutral position, the push-button marked N in Figure 9, was depressed thus elevating all the other push-buttons and permitting all the wedges 73 to drop to the inactive position. Under the assumption that the vehicle is to be started from rest in low gear, the push-button marked L in Figure 9, is depressed by the operator, thus raising the appropriate wedge 73 and also raising the neutral push-button, the push-button marked L being then locked in the lowered position and all the other push-buttons held in the raised positions. When the operator desires to make other changes in the gearing the appropriate push-button is depressed either at the time the change is desired or at any time previously thereto in anticipation of the desired change, whereupon, by a manipulation of the clutch pedal in the manner already described, the intended change for which the push-button is set, is brought about.

It is evident from the foregoing description that either none or only one of the selective wedges may be in operative position at any one time. The parts are so adjusted and timed in operation that a push-button must be depressed to a greater extent than half its travel before a wedge will be raised sufficiently to become operative to the cage or carriage and parts mounted therein, thereby absolutely preventing any liability of more than one selection at a time.

While in the foregoing description with reference to the drawings, particular attention has been called to a reciprocatory cage or carriage in which the gear shifting and neutralizing switches are mounted, it is feasible to provide an arrangement whereby these switches may be so formed and mounted as to rock as a whole about a common axis and also be moved individually each about an axis eccentric and transverse to the first named axis. In this manner the bodily movement about the common axis corresponds to the reciprocatory movement of the cage or carriage of the form already described and the individual movement about the second named axis corresponds to the rocking movements of the switches about the axis of the trunnions 59 and 63 of the other form of the invention.

The rotary form is shown in Figures 14 to 18 inclusive, and while the rotary or rocking form of the structure has mechanical differences over the reciprocatory form the general principle of operation is the same in both types of the invention.

In the rotary type, which is, in the construction shown in the drawings, a rockable type, there is provided a cage or carriage comprising a shaft 113 with spaced heads 114, 115 near opposite ends of the shaft and an intermediate web or partition 116, the heads 114 and 115 corresponding to the side walls of the frame 40 and the web or partition 116 corresponding to the web 41. The heads 114 and 115 and the web 116 are all integrally joined by a peripherally located wall 117 extending lengthwise of the frame made up of the heads, partition and connecting wall and concentric with the shaft 113 to which the frame is rigidly secured. The spaces between the intermediate web 116 and the heads 114 and 115 correspond to the compartments 42 and 43 of the reciprocating embodiment of the invention and intermediate of each head and the central web 116 there projects from the wall 117 a segmental wedge-shaped abutment 118 having its side faces beveled for a purpose which will hereinafter appear. At one long edge of the wall 117 the wall is formed with pockets corresponding to the lettered pockets of Figure 6 and correspondingly lettered, since in each form of the invention these lettered pockets represent certain positions either active or passive of the transmission gearing.

Located in the cage in each compartment between a head 114 and 115 and the intermediate web 116 are two pairs of associated gear-shifting and neutralizing switches operatively the same as those mounted in the reciprocatory carriage 40 but structurally somewhat different. These switches are designated by the same reference numerals with which the previously described switches are designated, but with the addition of the exponent "a". Two of the associated switches, say the switches 50[a] and 54[a] are shown separately in approximately proper relation except that they are axially separated, in Figures 17 and 18. The switch 50[a] is in the form of a disk 119 with one surface plane and with the other face having about half its surface, indicated at 120, parallel with the opposite face and the remainder of the surface, indicated at 121, beveled from an approximately diametric line 122 toward the periphery with a further bevel on the bevel face 121 from a line 123 perpendicular to the diametric line 122, said bevel being shown at 124 and containing a peripheral entering notch 125 at about the center of the bevel 124 and radial to the center of the disk. The peripheral portion of the disk 119 at approximately diametrically opposite points is provided with cutouts 126 and 127 to accommodate certain parts to be described.

On the periphery of the disk 119 practically opposite the notch 125 there is an enlargement 60$^a$ having a bevel surface 61$^a$ and walls corresponding to those of the enlargements 60 of the gear-shifting switches of the reciprocatory type of the invention.

The neutralizing switch 54$^a$ comprises a disk 128 having one face plane and the other face having a plane portion 129 parallel to the plane face 128 and a bevel portion 130 corresponding to the bevel portion 121 of the disk 119. The peripheral portion of the disk 128 is provided with an enlargement 66$^a$ of generally triangular shape with a recess or cutaway portion 69$^a$ corresponding to the parts 66 and 69 of the structure shown in Figures 6 and 13. About opposite to the longer end of the triangular enlargement 66$^a$ is a peripheral entering notch 130$^a$ and on opposite sides of this notch the plane face of the disk 128 has a chord bevel 131 similar to the bevel 124 of the disk 119. The periphery of the disk 128 has a cut-out portion 132 to accommodate certain parts to be described. Each disk 119 has an axial passage 133 beveled on opposite sides for a purpose which will hereinafter appear and each disk 128 has a similar axial passage 134 also beveled on opposite sides for a purpose which will hereinafter appear.

Extending lengthwise of the rotatable carriage through the heads 114 and 115 and the intermediate web 116 is a rod 135 adjacent to and spaced from the basic ends of the pockets toward the opposite edge of the wall 117, and also spaced from the axis of the carriage toward the peripheral portion thereof by a distance equal to the spacing of the notch 130 from the center of the disk 128. Spaced from the rod 135 by 90° and in a direction away from the base of the pockets and the same distance from the central axis of the carriage is another rod 138. Each rod is provided with eccentrically squared portions for entering the respective notches 130 and 125, these squared portions being best shown at 139 in Figure 16, and by dotted lines at 139 and 140 in Figure 15.

The gear-shifting and neutralizing switches are arranged in companion pairs, as in the previously described form of the invention, with each pair located with the bevel faces toward each other, one switch of a pair having its notched portion receiving one of the pivot rods and the other switch of the pair having its notched portion receiving the other pivot rod. This permits the yielding of the switch members and the directing of the diamonds in the same manner as in the reciprocatory form. The switch members are traversed by the shaft 113 after they have been mounted upon the pivot rods 135 and 138, the central beveled passages 133 and 134 in the switches permitting rocking movements on the pivot rods.

Adjacent gear-shifting switches 50$^a$ are normally held apart by springs 57$^a$ corresponding to the springs 57 in the previously described form of the invention. The cutout 127 is provided as a clearance for the rod 138 and the cut-out 132 provides a clearance for the rod 135.

Instead of defining the pockets into which the wedge blocks lodge by elongated tongues, such tongues may be replaced by taper switches 142, each pivoted at the larger end to an appropriate division wall between two adjacent pockets and with the taper or smaller end normally engaging against the longer side 68$^a$ of the projection 66$^a$, the switches 142 each having on the edge toward the axis of the rotary carriage a lug 143 entering the cut-out 126 of the neighboring gear-shifting switch. The neighboring switches 142 are held apart by an interposed spring 144 serving to maintain the points of the switches in contact with the respective walls 66$^a$ but permitting the switches to yield to the passage of a diamond 33 between them.

The shaft 113 is mounted in the end walls of the casing 30$^a$ in which are pivoted wedges 73$^a$ each carried by a lever 71$^a$ on a pivot rod 145 which may also be mounted in the end walls of the casing 30$^a$, and each lever 71$^a$ is under the control of a spring 72$^a$ the same as in the previously described construction. These wedges 73$^a$ are positioned to enter the recesses or cut-outs 69$^a$, each under the action of one of the impelling rods 98 the same as in the previously described construction.

One end of the shaft 113 exterior to the casing 30$^a$ through which it projects, carries a pinion 81$^a$ in the path of gear teeth of a mutilated gear wheel 80$^a$, which may include a segment only and correspond to the arm 80 of Figure 2, the pinion 81$^a$ corresponding in effect to the link 81 of Figure 2. The segment 80$^a$ is fast to a shaft 79$^a$ corresponding to the shaft 79 of Figure 2. Mounted on the shaft 79$^a$ is a bevel pinion 78$^a$ corresponding to the pinion 78 of Figure 2. Meshing with the pinion 78$^a$ is a bevel segment 76$^a$ corresponding to the rack bar 76 of Figure 2 and driven by a suitable connection, (not shown), with the clutch pedal lever.

Upon the peripheral portions of the heads 114 and 115 and of the intermediate partition 116 are channels 146 and 147, the channels having their mouths concentric with the axis of rotation of the carriage or movable member. These channels are positioned to each receive a tongue 148 on a respective wedge 73$^a$ when such wedge has been moved into active position within the chamber or recess 69$^a$ of a neutralizing switch. The length of the channels is such that the wedges 73$^a$ are positively held in position especially when the surface 61$^a$ moves into engagement with it and the continuation of engagement with such surface on the enlargement 60$^a$ of the gear-shifting switch, so that the tendency of the rotatable carriage to throw the wedge outwardly is counteracted by the walls of the channel in which the tongue 148 is at the time engaged, this relieving the actuating rod 98 from end pressure, which latter might cause a buckling of the rod sufficient to permit the wedge to move away from its active position.

Figures 14, 17, 18:
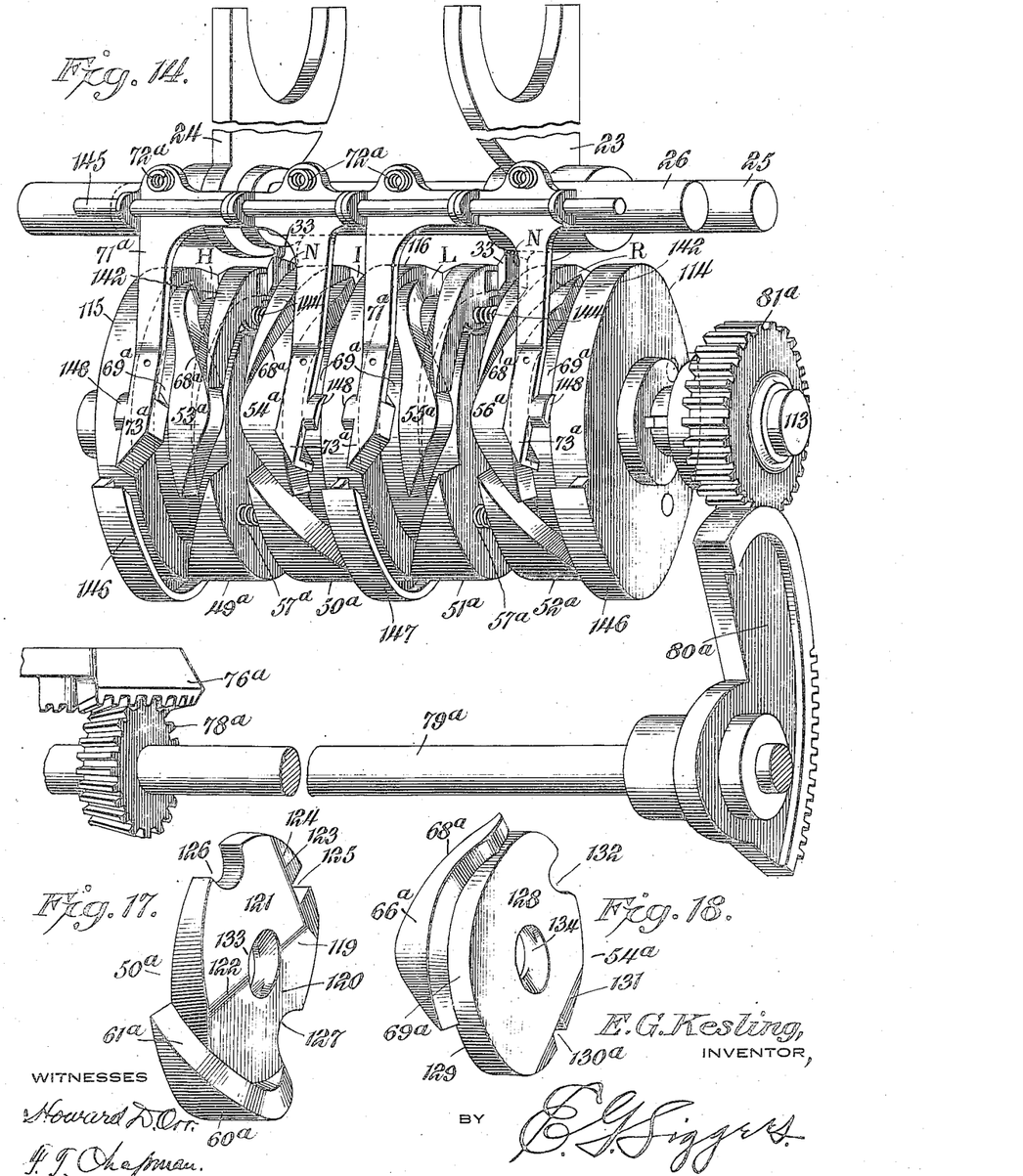
Figure 14 is a perspective view of another form of switch carrier and parts associated therewith, the view being taken from above.
Figure 17 is a perspective view of one of the gear-shifting switches shown in Figure 14 and associated figures.
Figure 18 is a perspective view of one of the neutralizing switches shown in Figure 14 and associated figures.
Figure 15:
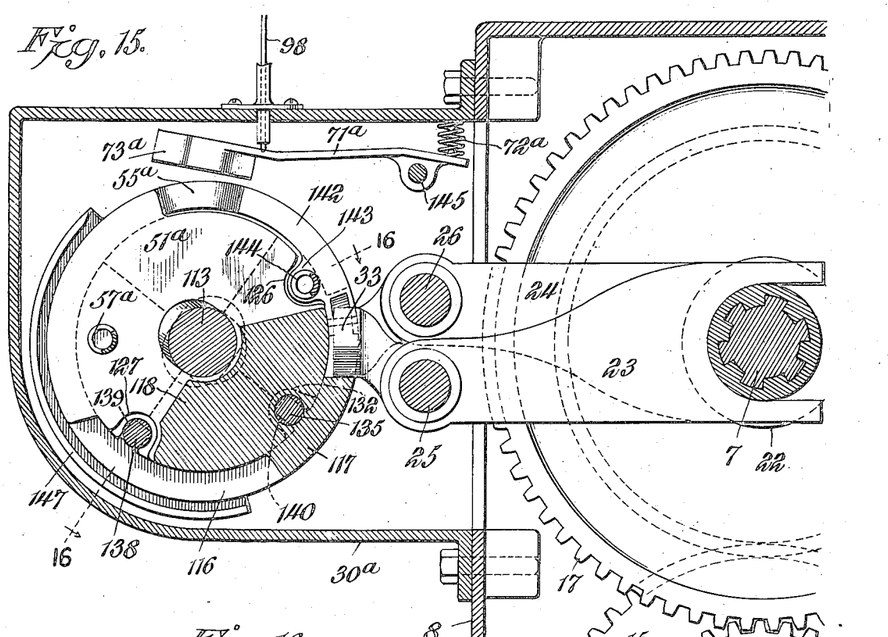
Figure 15 is a cross section of the structure shown in Figure 14 between two pairs of neighboring switches.
Figure 16:
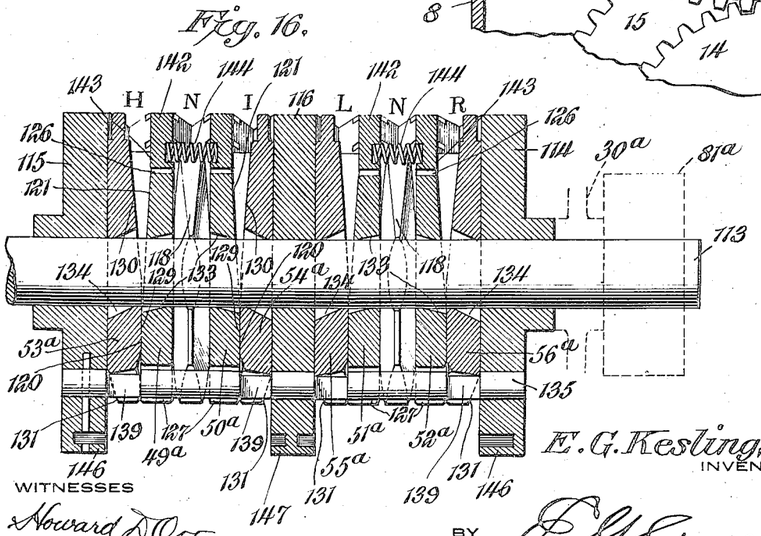
Figure 16 is a section on the line 16—16 of Figure 15.

The operation of the device of Figure 14 and associated figures is substantially that of the reciprocating form of carriage structure and so a detailed description of the operation need not be given.

When a selected wedge 73$^a$ has been moved by an appropriate push-button into active position a rotary movement of the carriage causes the wedge to engage against the wall 61$^a$ and thus rock the appropriate gear-shifting switch, say the switch 50$^a$ in the same manner as a like wedge 73 will rock a similar gear-shifting switch, say the switch 50, in the arrangement shown in Figure 6 and others of the figures, the only difference being that while in Figure 6 and other figures showing the reciprocatory type of gear-shifting switches, the switches are rocked about an axis longitudinal thereof, the rocking of the switches in Figure 14 and associated figures is about an axis tangential to a circle described about the longitudinal axis of the shaft 113. This is due to the fact that the switches in the structure of Figure 14 and associated figures are arranged circularly, while in Figure 6 and associated figures the switches are shown as straight.

Figure 19:
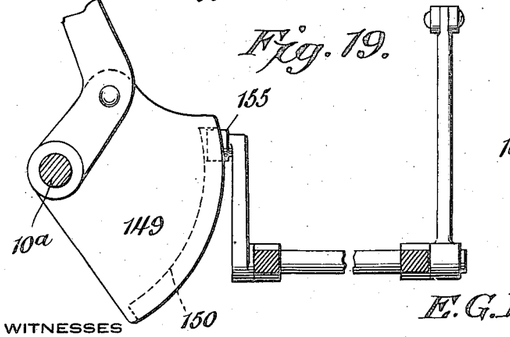
Figure 19 is a side elevation of another form of actuating mechanism between the clutch pedal and the gear-shifting devices.
Figure 20:
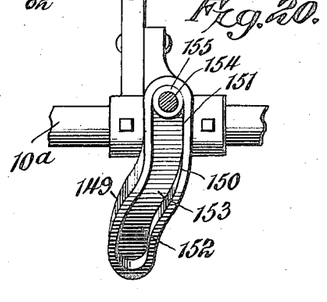
Figure 20 is a detail face view of a cam employed in the structure of Figure 19.

In Figures 19 and 20 there is shown an arrangement for transmitting motion from the clutch-pedal lever to the gear shift, whereby with a constant progressive movement of the clutch lever the beginning and terminal portions of the movement of the gear shift are slow and progressively changed to a relatively quick intermediate movement. This may be accomplished by mechanism operating in a manner similar to the arrangement shown in Figures 19 and 20. Mounted on the clutch lever shaft 10$^a$ is a segmental cam 149 which may or may not be integral with the clutch lever. This cam is provided with a groove 150 having terminal parallel portions 151 and 152 joined by a gentle reversely curved portion 153. The curvature is such that a pin or stud 154 lodged in the groove and preferably supplied with a roller 155 will be engaged but unaffected by the walls of the cam groove for a sufficient portion of the travel of the cam, say about half the travel of the cam, and then the roller will be shifted laterally, first by a slow progression and then more rapidly and then slowing up in its lateral movement until finally the lateral movement ceases at substantially the same time the movement of the cam ceases. The reverse movement is of course similar. In this way the carriage or movable member of the gear shift structure is relieved from sudden and relatively high speed movements at the beginning and end of its travel, while during the intermediate portion of the travel the movement may be relatively rapid. Where the structure just described, with reference to the Figures 19 and 20, is applicable, it is to be preferred to the arrangements shown and described in the preceding figures. Although in the showing of the drawings the device is made a part of the gear casing, it will be understood that the device may be conveniently located any where and the only connection with the gear case need be through a continuation of the gear shift rods.

In the drawings, the gear-shifting and neutralizing switches are shown as of solid construction, but it is evident that these switches may be made of hollow or skeleton form for purposes of lightness. These, however, are structural features which need not be particularly shown or described.

The flats 35 on the diamonds are useful in presenting relatively extended wearing surfaces instead of angles, wherefore, the liability of rapid wear and loss of fit with consequent loss of proper adjustment is avoided.

It will be understood that in the use of the emergency lever in connection with the blocks 27 having the recesses 28, the clutch pedal is operated in the same manner as already described to effect the proper shifting of the gears, that is, the clutch pedal is moved far enough to free the diamonds from the fingers, and then the proper one of the diamonds is shifted towards the position desired and the clutch pedal permitted to return, whereupon, the gearing is first moved into mesh by or before the time the pedal reaches the half of its full stroke.

What is claimed is:—

1. In a gear shifting mechanism for automobiles, a series of selective devices, means for actuating any chosen one of the selective devices to the exclusion of the others, controlling-switch devices subject to the selective devices, and gear-shifting means controlled by the switch devices.

2. An attachment for automobiles provided with transmission gearing and a clutch pedal, comprising a series of selective devices, means for actuating any chosen one of the selective devices to the exclusion of the others, controlling-switch devices subject to the selective devices, and gear-shifting means controlled by the switch devices, the selective devices, switch devices and gear-shifting means being positioned with respect to each other and timed in action with respect to the clutch pedal to effect the shift of the transmission gearing on the continued movement of the pedal forwardly after the clutch has been released.

3. An attachment for automobiles provided with transmission gearing and a clutch lever, comprising a movable member connected to and actuated by the continued forward movement of the clutch lever after the latter has disconnected the automobile engine, controlling switches on the movable member, selective devices for controlling the switches, and gear-shifting means controlled by the switches.

4. An attachment for automobiles provided with transmission gearing and a clutch lever, comprising a movable member connected to and actuated by the continued forward movement of the clutch lever after the latter has disconnected the engine, sets of controlling switches, each set comprising a gear-shifting switch and a neutralizing switch and mounted on the movable member, selective devices movable one at a time into the paths of the sets of the switches, and gear-shifting means controlled by the switches.

5. An attachment for automobiles provided with transmission gearing and a clutch lever, comprising sets of controlling switches, each set including a gear-shifting switch and a neutralizing switch, selective devices, one for each set of switches, and gear-shifting means controlled by the switches.

6. An attachment for automobiles provided with transmission gearing and a clutch lever, comprising sets of controlling switches, each set including a gear-shifting switch and a neutralizing switch, selective devices, one for each set of switches, and gear-shifting means controlled by the switches, each gear-shifting means including a device controllable by adjacent sets of diverting switches.

7. An attachment for automobiles provided with transmission gearing and a clutch lever and a spring therefor, comprising means controlled by the forward movement of the clutch lever for shifting the gearing from one active position to another, said means including means controlled by the clutch spring on the return movement of the clutch lever for directing the gearing into neutral position in the event that the shifting means fails to attain an effective active shifted position.

8. An attachment for automobiles provided with transmission gearing and a clutch lever and a spring therefor, comprising means controlled by the forward movement of the clutch lever for shifting the gearing from one active position to another, said means including means controlled by the return movement of the clutch lever for automatically directing the gearing into neutral position in the event that the shifting means fails to attain an effective active shifted position.

9. An attachment for automobiles provided with transmission gearing and a clutch lever, comprising means under the control of the clutch lever and acted upon by the clutch lever after the latter has released the clutch to shift the gearing, said means including means for automatically returning the gearing to the position from which it was last moved in the event of the first movement being insufficient to shift the gearing to another position.

10. In gear-shifting mechanism for automobiles, gear-shifting devices movable in a direction to effect the shifting of the gears, switches bodily movable in a direction transverse to the movement of the gear-shifting devices, and selective devices movable at will into the path of the switches to set the latter during their bodily movement to cause the switches to actuate the gear-shifting devices.

11. In gear shifting mechanism for automobiles, gear-shifting devices, and pairs of switches for acting upon the gear-shifting devices to divert them, the switches of each pair being arranged in succession and rockable transversely of their bodily movement and means for causing the rocking movements.

12. In gear shifting mechanism for automobiles, gear-shifting devices, and pairs of bodily movable switches with each pair of switches including a gear-shifting switch and a neutralizing switch for the gear-shifting devices, and selecting devices, one for each pair of switches and active upon the gear-shifting switch of the pair to which it is individual.

13. In gear shifting mechanism for automobiles, a bodily movable carrier, switches mounted on the carrier and movable therewith and also mounted for movement in the carrier in a direction transverse of the movement with the carrier, gear-shifting devices actuated by the switches, and selective devices associated with the switches for rendering the latter active at will upon the gear-shifting devices.

14. In gear shifting mechanism for automobiles, a movable carrier, rockable switches mounted in the carrier and movable bodily therewith, said switches being associated in pairs with one switch constituting a gear-shifting switch and the other switch constituting a neutralizing switch, devices controlling the shift gears of the automobile transmission gearing and in turn controlled by the switches, and selective devices movable at will one at a time into operative relation to the switches.

15. In gear shifting mechanism for automobiles provided with transmission gearing and a clutch pedal, a movable member under the control of the clutch pedal, pairs of associated switches on and movable with the movable member and mounted for movement transversely of the movable member, said switches being associated in pairs with one switch of each pair constituting a gear-shifting switch and the other switch of the pair constituting a neutralizing switch, switch-engaging devices connected to the shiftable gears of the transmission gearing and in position to be diverted by set ones of the switches, and selective devices, one for each pair of switches and each provided with means for moving it into operative relation to a pair of switches individual thereto for causing the setting of said pair of switches on the bodily movement of the switches by the clutch pedal.

16. In gear shifting mechanism for automobiles provided with transmission gearing and a clutch pedal, a movable member under the control of the clutch pedal, pairs of associated switches on and movable with the movable member and mounted for movement transversely of the movable member, said switches being associated in pairs with one switch of each pair constituting a gear-shifting switch and the other switch of the pair constituting a neutralizing switch, switch-engaging devices connected to the shiftable gears of the transmission gearing and in position to be diverted by set ones of the switches, and selective devices, one for each pair of switches and each provided with means for moving it into operative relation to a pair of switches individual thereto for causing the setting of said pair of switches on the bodily movement of the switches by the clutch pedal, the selective devices being further individualized to the gear-shifting switch of the pair of associated switches.

17. In gear shifting mechanism for the transmission gears of automobiles, controlling projections for the shiftable gears, a movable carrier, switches in the carrier for engaging and diverting the controlling projections, and selecting devices movable into the paths of the switches for setting chosen ones of the switches on the bodily movement of the carrier to propel the gear-controlling devices in accordance with the particular switches set.

18. In gear shifting mechanism for automobiles, diamond shaped projections controlling the movements of the shiftable gears of the transmission gearing of the automobile, a bodily movable carrier provided with pockets for receiving the projections at one limit of movement of the carrier, switches mounted on the carrier and movable in the carrier laterally of the direction of the bodily movement of the carrier, said switches being associated in pairs with one switch constituting a gear-shifting switch and the other switch constituting a neutralizing switch, and a selecting device for each pair of switches with means for moving it at will into the path of the gear-shifting switch of the pair for setting the switch to cause the shifting of the chosen gear of the transmission gearing on the bodily movement of the carrier.

19. In gear shifting mechanism for automobiles, diamond shaped projections controlling the movements of the shiftable gears of the transmission gearing of the automobile, a bodily movable carrier provided with pockets for receiving the projections at one limit of movement of the carrier, switches mounted on the carrier and movable in the carrier laterally of the direction of the bodily movement of the carrier, said switches being associated in pairs with one switch constituting a gear-shifting switch and the other switch constituting a neutralizing switch, a selecting device for each pair of switches with means for moving it at will into the path of the gear-shifting switch of the pair for setting the switch to cause the shifting of the chosen gear of the transmission gearing on the bodily movement of the carrier, the neutralizing switch being provided with an enlargement with angularly related engaging walls for a diamond shaped projection and a recess for receiving the selecting device individual to the pair of switches, and the gear-shifting switch being provided with a bevel surface for engaging the diamond shaped projection and for engagement with the selecting device.

20. In gear shifting mechanism for automobiles, diamond shaped projections controlling the movements of the shiftable gears of the transmission gearing of the automobile, a bodily movable carrier provided with pockets for receiving the projections at one limit of movement of the carrier, switches mounted on the carrier and movable in the carrier laterally of the direction of the bodily movement of the carrier, said switches being associated in pairs with one switch constituting a gear-shifting switch and the other switch constituting a neutralizing switch, a selecting device for each pair of switches with means for moving it at will into the path of the gear-shifting switch of the pair for setting the switch to cause the shifting of the chosen gear of the transmission gearing on the bodily movement of the carrier, the neutralizing switch being provided with an enlargement with angularly related engaging walls for a diamond shaped projection and a recess for receiving the selecting device individual to the pair of switches, and the gear-shifting switch being provided with a bevel surface for engaging the diamond shaped projection and for engagement with the selecting device, said switches also being associated in neighboring pairs with means for normally holding the pairs separated and the diamonds having a range of movement to be engaged by either pair of switches of the neighboring pairs.

21. In shifting mechanism for the transmission gearing of automobiles, projections controlling the shiftable gears of the transmission gearing, a bodily movable carrier with pockets for receiving the projections at the limit of the travel of the carrier in one direction, said pockets corresponding in number to the different active positions of the movable members of the transmission gearing and the intermediate neutral positions and said projections seating in the pockets and being locked therein, and means for causing the unseating and lateral shifting of the projections by the bodily movements of the carrier.

22. In shifting mechanism for the transmission gearing of automobiles, projections controlling the shiftable gears of the transmission gearing, a bodily movable carrier with pockets for receiving the projections at the limit of the travel of the carrier in one direction, said pockets corresponding in number to the different active positions of the movable members of the transmission gearing and the intermediate neutral positions and said projections seating in the pockets and being locked therein, and means for causing the unseating and lateral shifting of the projections by the bodily movements of the carrier, said means comprising pairs of associated switches for diverting the projections, and selecting devices each movable one at a time into operative relation to chosen switches to cause the active movement of the projection associated with the set switches.

23. In shifting mechanism for transmission gearing of automobiles, a movable member and a pair of associated switches mounted therein, one constituting a gear-shifting switch and provided with an enlargement beveled at one end, said switch being movable lengthwise and rockable transversely, and the other switch constituting a neutralizing switch with an enlargement having oppositely beveled walls with a recess behind them having a beveled wall extending therefrom, the second named switch being under the control of the first named switch.

24. In shifting mechanism for transmission gearing of automobiles, a movable member and a pair of associated switches mounted therein, one constituting a gear-shifting switch and provided with an enlargement beveled at one end, said switch being movable lengthwise and rockable transversely, and the other switch constituting a neutralizing switch with an enlargement having oppositely beveled walls with a recess behind them having a beveled wall extending therefrom, the second named switch being under the control of the first named switch, and a diamond shaped projection associated with the switches for engagement and shifting thereby laterally of the length of the switches, said projection being connected to and controlling the shiftable gears of the transmission gearing.

25. In a shifting mechanism for the transmission gearing of automobiles, a carrier movable about an axis and provided with pairs of associated switches constituting gear-shifting and neutralizing switches for the transmission gearing, said switches having pivotal mountings eccentric to the axis of rocking of the carrier with the axis of rocking substantially perpendicular to the length of the rockable carrier.

26. In a shifting mechanism for the transmission gearing of automobiles, a rockable carrier, pairs of switches on the carrier participating in the rocking movements thereof with the switches of each pair having beveled faces presented one toward the other to permit rocking movements of the switches toward and from each other in the direction of the length of the carrier, and members associated with the switches to be shifted thereby and each connected to a respective shiftable gear of the transmission gearing.

27. In shifting mechanism for the transmission gearing of automobiles, a rockable carrier, disk-like switching devices mounted on the carrier and rockable therewith and each rockable on an axis perpendicular to the length of the carrier and eccentric to the axis of rocking the carrier, the switches being associated into pairs with beveled facing portions, projecting members each connected to a respective one of the shiftable gears of the transmission gearing and located to be in the path of certain ones of the rockable switches, and selecting devices, one for each pair of switches for movement one at a time into the path of a pair of switches individual to the selecting devices for causing the second named rocking movement of the switches to divert the projecting members to move the shiftable gears in accordance with the selection made.

28. In shifting mechanism for the transmission gearing of automobiles, rockable pairs of associated switches having means for moving the switches bodily on lines substantially perpendicular to the direction of rocking, and selecting devices individual to each pair of switches for engaging one of the pair of switches to rock it, said selecting devices each comprising a lever having a constant constraint in a direction away from the switches and provided with a head for engaging one of the switches and shaped to impart a rocking movement to the engaged switch.

29. In shifting mechanism for the transmission gearing of automobiles, devices for effecting the gear-shifting, mechanical selecting means active upon the devices for effecting the gear-shifting, comprising movable means interposable into the path of the gear-shifting means for directing the course thereof, controlling means for the interposable devices comprising devices subject to manipulation and having flexible extensions to and controlling the interposable devices, and means for restricting the actuation of the controlling means to one at a time.

30. In shifting mechanism for the transmission gearing of automobiles, means for effecting the shifting of the gearing, and means for selectively controlling said shifting, comprising selecting members corresponding in number to the number of active positions of the shifting mechanism, manipulating devices greater in number than the active positions of the transmission gearing, connections between the selecting members and a corresponding number of the manipulating means, and a flexible device common to the full number of the manipulating means and having an amount of slack permitting the actuation of any one of the manipulating means while holding the others in inactive position.

31. In shifting mechanism for the transmission gearing of automobiles, shifting devices, and means for selecting working positions thereof, comprising a series of movable members subject to manipulation, a yieldable lock common to all the members, and means active on the movement of one of the members to operative position to hold all the other members in inactive position, and lock means common to all the members for holding an actuated member in the actuated position and thereby maintaining all the other members in the inactive position.

32. In shifting mechanism for the transmission gearing of automobiles. shifting devices, and means for selecting working positions thereof, comprising a series of movable members subject to manipulation, a yieldable lock common to all the members, means active on the movement of one of the members to operative position to hold all the other members in inactive position, and lock means common to all the members for holding an actuated member in the. actuated position and thereby maintaining all the other members in the inactive position, said lock means comprising a rockable bar with a lip movable into engagement with any one of the movable members, each of said members having recesses spaced apart in the direction of travel of the member and located so that one is entered by the lock member when the movable member is in the inactive position and the other is entered by the lock member when the movable member is in the active position.

33. In a shifting mechanism for transmission gearing of automobiles, means for selectively controlling the operation of the shifting mechanism, comprising selective devices for controlling the shifting mechanism, and manipulating means for controlling the selective devices, said manipulating means comprising a series of push-rods, each with notches or recesses spaced apart in the direction of travel of the rod, a flexible strand engaging all the push-rods and provided with sufficient slack so that when one rod is moved actively the other rods are held in the inactive position, and a rockable lock bar engagable in either of the notches of any rod and locking in the engaged notch of an actively moved rod and temporarily engaged in the other notches of the other rods, with said last named notches and the lock bar related to move the lock bar out of engagement with all the notches on the movement of any rod from the inactive toward active position.

In testimony, that I claim the foregoing as my own, I have hereto affixed my signature.

ELMER G. KESLING.